US012770415B2

(12) United States Patent
Heine et al.

(10) Patent No.: US 12,770,415 B2
(45) Date of Patent: Oct. 20, 2026

(54) LIGHT MICROSCOPY METHOD, DEVICE AND COMPUTER PROGRAM PRODUCT

(71) Applicant: Abberior Instruments GmbH, Gottingen (DE)

(72) Inventors: Jorn Heine, Witzenhausen (DE); Matthias Reuss, Gottingen (DE)

(73) Assignee: ABBERIOR INSTRUMENTS GMBH, Gottingen (DE)

(*) Notice: Subject to any disclaimer, the term of this patent is extended or adjusted under 35 U.S.C. 154(b) by 259 days.

(21) Appl. No.: 18/619,558

(22) Filed: Mar. 28, 2024

(65) Prior Publication Data

US 2024/0346839 A1 Oct. 17, 2024

(30) Foreign Application Priority Data

Apr. 11, 2023 (DE) ..................... 10 2023 109 107.7

(51) Int. Cl.
*G06V 20/69* (2022.01)
*G02B 21/36* (2006.01)
(Continued)

(52) U.S. Cl.
CPC ......... *G06V 20/698* (2022.01); *G02B 21/365* (2013.01); *G02B 27/58* (2013.01);
(Continued)

(58) Field of Classification Search
CPC .... G02B 21/365; G06T 7/0012; G06V 20/69; G06V 20/693; G06V 20/698;
(Continued)

(56) References Cited

U.S. PATENT DOCUMENTS 7,088,854 B2 8/2006 Cotman et al.
10,114,368 B2 10/2018 Greenberg et al.
(Continued)

FOREIGN PATENT DOCUMENTS

CN 115375669 A * 11/2022 ............. G06V 10/40
DE 10 2020 211 699 A1 3/2022
(Continued)

OTHER PUBLICATIONS

K. Gladunova, "Super-resolution microscopy," 2015 International Young Scientists Forum on Applied Physics (YSF), Dnipropetrovsk, Ukraine, 2015, pp. 1-2, doi: 10.1109/YSF.2015.7333214.) (Year: 2015).*
(Continued)

*Primary Examiner* — Matthew C Bella
*Assistant Examiner* — Janice E. Vaz
(74) *Attorney, Agent, or Firm* — MOSER TABOADA

(57) ABSTRACT

The present disclosure relates to a light microscopic method comprising acquiring first light microscopic data of a sample in a first acquisition mode, recognizing an object in the sample from the first light microscopic data and assigning the object to an object class using a first artificial intelligence method, acquiring second light microscopic data in a second acquisition mode and assigning the object to a subcategory of the object class based on the second light microscopic data using the first artificial intelligence method or a second artificial intelligence method, a computer program product and a device comprising a light microscope for carrying out the method.

18 Claims, 3 Drawing Sheets

(51) Int. Cl.

| | |
|---|---|
| ***G02B 27/58*** | (2006.01) |
| ***G06V 10/764*** | (2022.01) |
| ***G06V 10/778*** | (2022.01) |
| ***G06V 10/82*** | (2022.01) |
| ***G06V 10/94*** | (2022.01) |

(52) U.S. Cl.
CPC ........ *G06V 10/764* (2022.01); *G06V 10/7788* (2022.01); *G06V 10/82* (2022.01); *G06V 10/945* (2022.01); *G06V 20/693* (2022.01)

(58) Field of Classification Search
CPC .... G06V 10/764; G06V 10/809; G06V 10/82; G06V 10/774; G06F 18/2431
See application file for complete search history.

(56) References Cited

U.S. PATENT DOCUMENTS

| | | | | |
|---|---|---|---|---|
| 10,928,335 | B2 | 2/2021 | Potocek | |
| 2010/0111396 | A1 | 5/2010 | Boucheron | |
| 2015/0213302 | A1 | 7/2015 | Madabhushi et al. | |
| 2019/0187079 | A1 | 6/2019 | Lang et al. | |
| 2020/0371333 | A1 | 11/2020 | Amthor et al. | |
| 2021/0264595 | A1* | 8/2021 | Plesch | G06T 7/0012 |
| 2022/0334371 | A1 | 10/2022 | Bokadia et al. | |
| 2023/0291992 | A1* | 9/2023 | Misch | G06V 20/698 |

FOREIGN PATENT DOCUMENTS

| | | | |
|---|---|---|---|
| DE | 10 2021 125 576 | A1 | 4/2023 |
| EP | 3 608 701 | A1 | 2/2020 |
| EP | 3 734 515 | A1 | 11/2020 |
| WO | WO 2019/229151 | A2 | 12/2019 |
| WO | WO 2022/038527 | A1 | 2/2022 |

OTHER PUBLICATIONS

German Search Report for application No. 10 2023 109 107.7 dated Oct. 2, 2023.

J. Cnossen et al., Localization microscopy at doubled precision with patterned illumination (2019), bioRxiv, Feb. 20, 2019, 45 pages, https://doi.org/10.1101/554337.

Y. Lecun et al., Deep learning (2015) Nature, May 28, 2015, pp. 436-444, vol. 521, doi: 10.1038/nature14539.

T. Scherr et al., Best Practices in Deep Learning-Based Segmentation of Microscopy Images (2018), Proc. 28. Workshop Computational Intelligence, Dortmund, Nov. 30, 2018, pp. 175-195.

B. Jiang et al., Acquisition of Localization Confidence for Accurate Object Detection, ECCV 2018 paper, 16 pages, https://link.springer.com/conference/eccv.

European Search Report for Application No. 24168894.4 dated Aug. 20, 2024.

* cited by examiner

LIGHT MICROSCOPY METHOD, DEVICE AND COMPUTER PROGRAM PRODUCT

CROSS-REFERENCE TO RELATED APPLICATIONS

The present application claims the benefit of and priority to DE Patent Application Serial No. 10 2023 109 107.7, filed Apr. 11, 2023, the entire contents of which is incorporated herein by reference.

TECHNICAL FIELD

The present disclosure relates to a light microscopy method in which objects in a sample are automatically classified using artificial intelligence methods as well as a device and a computer program product with which the method can be carried out.

PRIOR ART

Various artificial intelligence methods are known from the prior art, with which it is possible, among other things, to automatically classify input data or input signals.

So-called deep learning methods are particularly suitable for classifying image data. Deep learning methods belong to the so-called representation learning methods, i.e. they are able to learn from annotated raw data. In addition, deep learning methods are characterized by the fact that representations of the data are formed in different layers.

An overview of deep learning methods, in particular neural networks, can be found, for example, in the publication "Deep Learning" by Y. LeCun, Y. Bengio and G. Hinton, Nature 521 (2015), 436-444.

Artificial neural networks (ANN) are data processing networks that can particularly schematically simulate structures in the animal and human brain. They consist of processing nodes that are organized in an input layer, an output layer and typically a number of hidden layers located between the input layer and the output layer. Each node receives input data, processes it using a non-linear function and outputs output data to subsequent nodes. The nodes of the input layer receive input data (training data or test data). The nodes of the hidden layers and the output layer typically receive the output data from several nodes of the previous layer in the data flow direction. Weights are defined (at least implicitly) for all connections between nodes, i.e. relative proportions with which the input data is taken into account during processing with the non-linear function. A network can be trained for a specific task, e.g. the segmentation or classification of image data, by processing training data by the network, applying an error function to the result, the value of which reflects the correspondence of the determined result with the correct result, and adjusting the weights between the nodes based on the error function. For example, a gradient of the error function can be determined for each weight using a so-called back propagation, and the weights can be adjusted based on the steepest gradient.

Convolutional neural networks (CNN) are a subgroup of neural networks that contain so-called convolutional layers, which are typically followed by pooling layers. In convolutional layers, the data transfer between two layers can be represented by a convolution matrix (also known as a kernel or filter bank), i.e. each input node receives the inner product between the output data of a part of the nodes of the previous layer with the convolution matrix as input data. In so-called pooling, the output data of a layer are transferred to a layer with a smaller number of nodes, wherein the output data of several nodes is offset against each other.

Such neural convolutional networks are particularly advantageous in image processing, as the convolutional layers greatly improve the recognition of local structures and the displacement invariance.

In the field of image processing of microscopic data, artificial intelligence methods, in particular artificial neural networks, have already been used for a variety of tasks, for example for the segmentation of image data (see e.g. "Best Practices in Deep-Learning-Based Segmentation of Microscopy Images" by T. Scherr, A. Bartschat, M. Reischl, J. Stegmaier and R. Mikut (Proc. 28 Workshop Computational Intelligence, Dortmund, 29-30 Nov. 2018, 175-195).

U.S. Pat. No. 7,088,854 B2 describes a computer program product and a method for generating image analysis algorithms, in particular based on artificial neural networks. An image with chromatic data points is obtained (in particular from a microscope) and an evolving algorithm is generated which divides the chromatic data points into objects based on a previous user evaluation, wherein the algorithm can subsequently be used for the automatic classification of objects.

US 2010/0111396 A1 describes a method for analyzing images of biological tissue in which biological objects are classified pixel by pixel and the identified classes are segmented in order to agglomerate identified pixels into segmented regions. The method can be used, for example, to differentiate between the nuclei of cancer cells and non-cancer cells.

Patent application US 2015/0213302 A1 also deals with cancer diagnostics using artificial intelligence. In the method described, an artificial neural network is combined with a classification algorithm based on manually extracted features. For example, an image of a biological tissue sample is taken with a microscope and segmented to obtain a candidate mitosis patch. This is then classified with the neural network and subsequently with the classification algorithm. The candidate patch is then classified as mitotic or non-mitotic based on both classification results. The results can be used by an automatic cancer classification system.

A method for scanning partial areas using a scanning microscope, in particular a laser scanning microscope, is known from WO 2019/229151 A2. In the method, areas to be scanned are first selected from an overview image with the aid of an artificial intelligence system and the selected areas are imaged by scanning with the scanning microscope. An overall image is then calculated, wherein the non-scanned areas are estimated from the scanned areas.

A similar method from the field of electron microscopy is known from US 2019/0187079 A1. A scanning electron microscope is first used to perform an initial scan of a region of interest of the sample. Subsequently, partial areas of this region of interest are scanned with adapted parameters in a previously optimized sequence.

EP 3 734 515 A1 describes a method for controlling an autonomous wide-field light microscope system. Artificial neural networks trained by reinforcement learning are used to recognize structures in the sample. First, a low magnification image is taken with a first objective. Based on this image, a region of interest in the sample is automatically selected by a first trained artificial neural network. A second objective is then used to capture a higher magnification image of the region of interest. A second trained artificial neural network then identifies a target feature in the higher magnification image and generates a statistical result. Based on the statistical result, a feedback signal is generated for the first artificial neural network. This method aims to already perform the selection of the region of interest in the sample from the low magnification image in such a way that the target feature can be identified later in the higher magnification image.

Such a microscope system is optimized for the time-optimized detection of a target feature in a larger sample, for example for the detection of tumor cells in a tissue section and classification of the corresponding tissue as tumor tissue.

In some automated screening tasks, however, the problem arises that a large number of, in particular morphologically very similar, objects occur in regions of interest, of which only a certain subset is to be examined for the presence of a certain target feature. For example, a sample may contain biological cells at different growth stages, wherein the expression of a marker protein (in this case the target feature) is only induced by a candidate agent at a certain growth stage. This is particularly problematic if the subset of interest comprises only a very small proportion of the total number of objects in the sample.

OBJECTIVE OF THE DISCLOSURE

The objective of the present disclosure is therefore to provide a light microscopic method, a device and a computer program product for carrying it out, which is suitable for automatically recognizing objects of a category in a sample and automatically identifying a subset of objects of a subcategory.

Solution

This objective is attained by the subject matter of independent claims. Advantageous embodiments are given in the subclaims and are described below.

Description

A first aspect of the disclosure relates to a light microscopy method comprising the following steps: acquiring first light microscopic data of a sample in a first acquisition mode, recognizing an object in the sample from the first light microscopic data and assigning the object to an object class using a first artificial intelligence method, acquiring second light microscopic data of the sample, in particular the recognized object, in a second acquisition mode and assigning the object to a subcategory of the object class based on the second light microscopic data using the first artificial intelligence method or a second artificial intelligence method.

The objects of the subcategory may, for example, contain a target feature of interest, i.e. the subcategory may be defined by the presence of the target feature. For example, the object class may be a particular type of biological cell and the subcategory may be characterized by the expression of a particular protein marker. This protein marker may, for example, indicate a desired response to an agent to be tested on a cell population.

Alternatively, it is also possible, for example, that the object class is a certain type of biological cell and the subcategory is a growth stage, e.g. "mitotic". In certain cell types, such growth stages are morphologically very similar, which requires additional staining for reliable differentiation, for example, which can be detected by detecting fluorescence (here, for example, the second imaging mode). In a subsequent step, the objects of the subcategory (e.g. the mitotic cell population) can then be examined for further characteristics (e.g. the expression of a marker protein), e.g. based on a further analysis of the second light microscopic data or by acquiring further light microscopic data.

The various imaging modes thus make it possible to assign objects to subcategories, which makes it possible to implement significantly more complex automatic screening tasks than with methods known from the prior art. The method according to the disclosure is particularly effective in that second light microscopic data of objects already recognized based on first light microscopic data are specifically acquired in the second acquisition mode specially designed for this purpose. This eliminates the need to re-image the entire sample area due to the targeted analysis of the objects and thus increases the measurement speed, in particular of an automated long-term measurement, and reduces potentially damaging influences on the sample.

The steps of the method according to the disclosure can be carried out one after the other or in parallel. In particular, the acquisition of the second light microscopic data can be carried out after the object has been recognized, wherein more particularly only the recognized object or an area around the object recognized based on the first light microscopic data is imaged or displayed based on a localization. This is advantageous, for example, if light microscopic images in the second acquisition mode require a long acquisition time and/or may damage the sample (which may be necessary in particular to achieve a higher resolution). Alternatively, the first light microscopic data and the second light microscopic data of the sample may be acquired simultaneously or in quick succession and the recognition of the object based on the first light microscopic data and the assignment to the subcategory based on the second light microscopic data may be performed after the data acquisition is completed. This is possible, for example, if the first and second acquisition modes comprise a spectrally separated acquisition of luminescent light from two different luminescent dyes.

In the context of the present specification, the term "light microscopic data" includes in particular image data and localization data. In contrast to image data, which are obtained by an optical imaging of a part of the sample, in particular by wide-field microscopy or scanning microscopy, localization data comprises estimate positions of individual emitters (e.g. fluorophores, quantum dots, reflective nanoparticles or the like) in the sample. Such localization data can be represented in the form of a localization map of the positions of several emitters localized in different localization steps, which resembles a classical microscopic image. Well-known localization microscopy methods include PALM/STORM and related methods as well as MINFLUX. The light microscopic data may also be image data or localization data of a series of images, e.g. a so-called time-lapse image or an axial stack of images (so-called z-stack). The light microscopic data may be encoded in one or more channels in suitable file formats, e.g. as gray values or color values.

The first acquisition mode and the second acquisition mode differ from each other by light microscopic parameters and may or may not use the same imaging or localization principle. For example, it is possible that both in the first acquisition mode and in the second acquisition mode the sample is imaged by confocal scanning microscopy, wherein scanning parameters differ between the first acquisition mode and the second acquisition mode, e.g. the pixel dwell time or the scanning speed. A confocal 2D scanning image of the sample could also be acquired in the first acquisition mode and a confocal 3D scanning image in the second acquisition mode. An example of different imaging principles would be a wide-field fluorescence image (wide-field illumination, spatially resolved detector) in the first acquisition mode and a confocal laser scanning image in the second acquisition mode.

According to one embodiment of the method, the first acquisition mode and the second acquisition mode are based on different imaging or localization principles.

According to a further embodiment, the second light microscopic data is acquired faster in the second acquisition mode than the first light microscopic data in the first acquisition mode. This increases the speed of an automatic screening process in particular, as the slower acquisition mode is used to analyze individual objects instead of the entire sample.

Recognizing the object and assigning the object to the object class may be carried out one after the other or in one step. The term "recognizing the object" may also include semantic segmentation, instance segmentation and/or so-called localization (i.e. determining the position in an image section) of the object. If two separate steps are carried out, a specialized first artificial intelligence method could, for example, perform a segmentation of an image and a specialized second artificial intelligence method could assign object classes to recognized segments.

However, it is also possible, for example, for a single artificial intelligence method to carry out coupled recognition/classification. The first artificial intelligence method and the second artificial intelligence method comprise in particular an artificial intelligence algorithm. Therein, in particular, a trained data processing network such as a support vector machine, an artificial neural network or a multilayer perceptron is used.

According to one embodiment, the method further comprises automatically recognizing a target feature in the objects of the subcategory, in particular using the first light microscopic data, the second light microscopic data and/or third light microscopic data. The third light microscopic data may be acquired in the first acquisition mode, the second acquisition mode or a third acquisition mode. In particular, the target feature may be recognized using the first artificial intelligence method, the second artificial intelligence method or a third artificial intelligence method. An example of a target feature is the expression of a marker protein in a biological cell, which can be detected, for example, by coupling the marker protein to a fluorophore, exciting the fluorophore and detecting the fluorescence.

According to one embodiment of the method, the first light microscopic data are acquired in the first acquisition mode in a first color channel, wherein the second light microscopic data are acquired in the second acquisition mode in a second color channel that is different from the first color channel. For example, different staining or labeling with fluorophores of a biological cell can be detected in the first color channel and the second color channel, e.g. nuclear staining (e.g. with the dye DAPI) and labeling of a specific cytosolic protein by coupling a fluorophore via a specific antibody.

According to a further embodiment, the first light microscopic data are acquired in the first acquisition mode with a first resolution, wherein the second light microscopic data are acquired in the second acquisition mode with a second resolution that is higher than the first resolution. In particular, the second light microscopic data in the second acquisition mode are acquired faster than the first light microscopic data in the first acquisition mode.

The term "resolution" is understood as the smallest distance between two point-like objects with a diameter smaller than the diffraction limit at which the two objects can be displayed separately using the given imaging or localization method. A higher resolution corresponds to a smaller distance, i.e. a better separation capability of the imaging or localization method.

By increasing the resolution in the second acquisition mode, for example, smaller structures within the objects in the sample can be made visible, which may be necessary, for example, if a target feature to be detected is a specific localization of a dye or fluorescent marker within a biological cell. The increase in resolution can be achieved, for example, by using different imaging or localization principles in the first and second acquisition modes. For example, a confocal laser scanning image (second imaging mode) results in an increased axial resolution compared to a wide-field fluorescence image (first imaging mode) due to optical sectioning and, depending on the aperture of the pinhole, possibly also an increased lateral resolution.

Furthermore, the resolution in the second imaging mode may also be increased, for example, by STED microscopy, i.e. by generating a STED light distribution with a central intensity zero at the geometric focus to deplete the excited state of the fluorophores in the regions around the zero. Since STED microscopy is usually performed by scanning the sample with the combined excitation and STED focus, it is convenient in such embodiments if a confocal laser scanning image (without STED light) is acquired in the first acquisition mode. Alternatively, a STED image may be acquired in both the first and second acquisition modes, wherein the STED intensity or STED power is higher in the second acquisition mode than in the first acquisition mode. As a result, a narrower effective point spread function of the detection light is achieved in the second acquisition mode, which results in an increase in resolution.

According to a further embodiment, a super-resolution light microscopy method, in particular a STED microscopy method, a RESOLFT microscopy method, a MINFLUX method, a STED-MINFLUX method, a PALM/STORM method, a SIM method or a SIMFLUX method, is carried out in the second acquisition mode.

A super-resolution light microscopy method is understood to be a method that (under suitable boundary conditions) is suitable for achieving a resolution below the diffraction limit. The diffraction limit for lateral resolution is given in particular by the Abbe criterion or Rayleigh criterion.

As described above, in STED microscopy a light distribution of STED light with a central local intensity minimum is superimposed with focused excitation light. Fluorophores around the minimum are returned from the excited state to the ground state by the STED light through stimulated emission depletion, so that the fluorescence only originates from a very narrowly limited area around the minimum. This improves the resolution.

In RESOLFT microscopy, the same concept is implemented with a light distribution of switching light that puts switchable fluorophores in the area around the minimum into a non-fluorescent state.

MINFLUX microscopy is a light microscopic method for localizing or tracking individual emitters in a sample with a resolution in the low nanometer range. In this method, the sample is exposed to an excitation light distribution with a local minimum at different positions and a photon emission rate is determined for each position. A position of the individual emitter is then estimated from the photon rates and the corresponding positions using a position estimator.

This process can be continued iteratively by placing the local minimum of the light distribution at positions increasingly closer to the previously estimated position and successively increasing the light intensity. This method is characterized by a very high positional accuracy and photon efficiency.

In a variant of the MINFLUX method, referred to here as STED-MINFLUX, the sample is exposed with a combination of a regular (approximately Gaussian) excitation focus and a STED light distribution with a local minimum, wherein a photon emission rate is also determined for each position and the position of an individual emitter is estimated from the positions and the associated photon emission rates. A similar method is known as MINSTED.

The term PALM/STORM method is used here to describe a series of localization methods for individual emitters in a sample. These methods are characterized by the fact that a localization map of several emitters is determined by calculation with a higher resolution than the diffraction limit, taking advantage of the fact that the emitters switch back and forth, in particular periodically, between a state that can be excited to fluorescence and a dark state that cannot be excited. In the PALM, STORM and dSTORM methods and related methods, a high-resolution camera is used to acquire several wide-field fluorescence images over a period of time in which at least some of the emitters change state. The localization map is then calculated based on the entire time series, wherein the emitter positions are determined by centroid determination of the image of the detection PSF on a spatially resolving detector. The sample conditions are set so that the average distance of the emitters in the excitable state is above the diffraction limit, so that the point spread functions of the individual emitters can be displayed separately on the detector at any time in the time series.

In the SOFI technique, which is also classified here as a PALM/STORM method, the temporal autocorrelation functions of spontaneously flashing individual emitters are evaluated in order to obtain a localization map with a resolution below the diffraction limit.

With the SIM technique, super-resolution is achieved by illuminating the sample with a structured light distribution.

The term "SIMFLUX method" describes a a single-molecule localization method described, for example, in the article Cnossen J, Hinsdale T, Thorsen RØ, Siemons M, Schueder F, Jungmann R, Smith C S, Rieger B, Stallinga S. Localization microscopy at doubled precision with patterned illumination. Nat Methods. 2020 January; 17 (1): 59-63. doi: 10.1038/s41592-019-0657-7. Epub 2019 Dec. 9. PMID: 31819263; PMCID: PMC6989044, in which the sample is illuminated sequentially with mutually orthogonal periodic patterns of excitation light with different phase shifts. The centroid position of individual molecules is estimated from the photon counts measured with a spatially resolving detector.

According to a further embodiment, a confocal scanning microscopy method or a wide-field luminescence microscopy method is carried out in the first acquisition mode.

In a confocal scanning microscopy method, excitation light is focused into the sample and the focus is shifted relative to the sample, wherein the light emitted by emitters in the sample (in particular reflected excitation light or fluorescent light) is detected confocally to the focal plane in the sample. Therein, the excitation light beam can be moved over the stationary sample with a beam scanner or the sample can be moved relative to the stationary light beam. The emission light can also be de-scanned or detected without being de-scanned.

In wide-field luminescence microscopy, the sample is illuminated approximately homogeneously with excitation light in one area and luminescent light emitted by emitters in the sample, in particular fluorescent light, is typically detected with a camera. In the context of automatic screening of objects, wide-field luminescence microscopy has the advantage that a relatively large sample section with a large number of objects to be analyzed can be captured quickly.

According to a further embodiment, the first light microscopic data and the second light microscopic data are acquired with the same magnification, in particular with the same objective. This has the advantage that the first light microscopic data and the second light microscopic data are easily comparable, so that an evaluation based on a combination of the first and second light microscopic data can be carried out more easily. Capturing the first and second light microscopic data with the same objective has the advantage that no objective change is necessary when capturing a large number of images or localization maps, which greatly increases the acquisition speed.

According to a further embodiment, the method is carried out automatically. The automatic recognition and classification of objects in a sample is very well suited, for example, for the automated analysis of a large number of samples, such as is carried out when screening new pharmacological drug candidates. For this purpose, in particular, a control unit is coupled with a light microscope, which carries out a sequence of several light microscopic measurements and any analyses carried out in between (if applicable) by a processor. To ensure constant environmental conditions, the sample may be placed in an incubator, for example, especially in the case of biological samples such as living cells.

According to a further embodiment, the method is carried out repeatedly. In particular, this means that first light microscopic data are acquired several times in succession in one or more samples, objects are automatically recognized and assigned to a category, second light microscopic data are acquired and the objects are automatically assigned to a subcategory.

According to a further embodiment, the second light microscopic data are three-dimensional light microscopic data, in particular wherein the first light microscopic data are two-dimensional light microscopic data.

According to a further embodiment, the second light microscopic data are generated by acquiring an axial stack of images.

Three-dimensional data, especially axial stacks of images, require a relatively long acquisition time, but provide additional information about the imaged objects. It is therefore particularly advantageous to first perform object recognition based on the first light microscopic data before determining a subcategory based three-dimensional data. The three-dimensional acquisition can be carried out on certain sample regions with the objects recognized in the first acquisition mode, which reduces the measurement time and may reduce the load on the sample.

According to a further embodiment, the first artificial intelligence method is a deep learning method.

According to a further embodiment, the second artificial intelligence method is a deep learning method.

In the context of the present specification, the term "deep learning method" refers to an artificial intelligence method that uses raw data (as opposed to customized feature vectors in other AI methods) as input data, wherein representations of the input data are formed in different layers.

According to a further embodiment, the first artificial intelligence method is carried out by means of a first trained data processing network, in particular an artificial neural network. According to a further embodiment, the second artificial intelligence method is carried out by means of a second trained data processing network, in particular an artificial neural network.

In the context of the present specification, the term “artificial neural network” means a data processing network comprising a plurality of nodes organized in an input layer, at least one hidden layer and an output layer, wherein each node converts input data into output data by means of a non-linear function, and wherein weights are defined (at least implicitly) between the input layer and a hidden layer, between a hidden layer and the output layer and optionally (in the event that several hidden layers are provided) between different hidden layers the weights indicating proportions with which the output data of a respective node are taken into account as input data of a node downstream of the respective node in a data flow direction. In particular, the weights may also be defined by convolution matrices.

The definition “neural network” according to this specification includes not only so-called convolutional neural networks, which are characterized by a convolutional operation between convolutional layers and by pooling layers that combine the input data in fewer nodes than the respective upstream layer in the data flow direction, but in particular also so-called fully connected networks or multilayer perceptrons with exclusively fully connected layers, in particular of the same dimension.

A trained neural network is a neural network that comprises weights adapted to a specific task by processing training data.

According to a further embodiment, the first artificial intelligence method and/or the second artificial intelligence method is trained by means of a user input, in particular in parallel with the execution of the method. The user input can be used, for example, to specify whether a recognition and classification of an object carried out by the first artificial intelligence method is correct and/or whether a determination of the subcategory carried out by the first or second artificial intelligence method is correct. The advantage of this type of reinforcement learning is that the first artificial intelligence method and/or the second artificial intelligence method learns during operation without the need to provide further training data.

According to a further embodiment, the object is a biological entity, in particular a biological cell, further in particular a living cell, or an organelle. Further biological entities may be, for example, organs, tissues or cell assemblies, viruses, bacteriophages, protein complexes, protein aggregates, ribosomes, plasmids, vesicles or the like. The term “biological cell” includes cells of all domains of life, i.e. prokaryotes, eukaryotes and archaea. Living cells exhibit in particular a division activity and/or a metabolic activity which can be detected by methods known to the person skilled in the art. The term “organelles” includes known eukaryotic subcellular structures such as the cell nucleus, the Golgi apparatus, lysosomes, the endoplasmic reticulum, but also structures such as the bacterial chromosome.

According to a further embodiment, the object class describes a cell type, an organelle type, a first phenotype or a cell division stage.

In the context of the present specification, the term “phenotype” is generally understood as the expression of traits of a cell. This includes both trait characteristics caused by genetic changes and trait characteristics caused by environmental influences or active substances, for example.

According to a further embodiment, the subcategory describes a second phenotype, in particular a phenotype caused by an active substance added to the sample, a localization of components (e.g. proteins) of the object (in particular the cell) or a pattern of components (e.g. proteins) of the object (in particular the cell). Phenotypes induced by chemicals may be used in particular to find new pharmacological agents in the context of drug screening.

According to a further embodiment, the object class describes a rare and/or transient state of the object, in particular of the biological cell. Automated analysis is particularly suitable for detecting such rare or transient states.

According to a further embodiment, third three-dimensional light microscopic data of the sample are acquired, in particular between the acquisition of the first light microscopic data and the second light microscopic data, wherein a partial region of the recognized object is selected, in particular automatically, based on the third light microscopic data, and wherein the second light microscopic data are acquired from the selected partial region of the recognized object. Such step-by-step data acquisition can initially identify a relevant partial region of an object that is highly likely to contain information about the subcategory to which the object belongs. This significantly improves the assignment of the subcategory in the next step.

The third light microscopic data are acquired in particular in a third acquisition mode, which differs from the first acquisition mode and the second acquisition mode. The achievable resolution of the third acquisition mode may in particular be equal to the resolution of the first acquisition mode or in particular lie between the resolution of the first acquisition mode and the second acquisition mode. In particular, the third light microscopic data may be acquired at the same speed or slower than the first light microscopic data. In particular, the third light microscopic data is acquired faster than the second light microscopic data.

According to a further embodiment, the third light microscopic data is generated by acquiring an axial stack of images. This is particularly advantageous for thicker objects in order to find the correct image plane of the object in which relevant information, especially about the subcategory of the object, is available.

A second aspect of the disclosure relates to a device, in particular for carrying out the method according to the first aspect, comprising a light microscope which is configured to acquire first light microscopic data of a sample in a first acquisition mode and to acquire second light microscopic data of the sample in a second acquisition mode, and a processor which is configured to recognize an object in the sample from the first light microscopic data using a first artificial intelligence method and to assign the object to an object class, wherein the processor is further configured to assign the object to a subcategory of the object class based on the second light microscopic data using the first artificial intelligence method or a second artificial intelligence method.

According to one embodiment, the device comprises a control unit which is configured to cause the light microscope to acquire the second light microscopic data, in particular of the object recognized from the first light microscopic data, in the second acquisition mode.

According to one embodiment, the device comprises a control unit configured to cause the light microscope to acquire a plurality of sets of first light microscopic data and second light microscopic data of the sample or a plurality of samples and to cause the processor to recognize, classify and sub-categorize a plurality of objects.

A third aspect of the disclosure relates to a non-transitory computer-readable medium for storing computer instructions for carrying out a light microscopy method that, when executed by one or more processors associated with a device comprising a light microscope is configured to perform the method according to the first aspect.

Further embodiments of the device according to the second aspect and of the computer program product according to the third aspect result from the embodiments of the method according to the first aspect described above.

Advantageous further embodiments of the disclosure are shown in the claims, the description and the drawings and the associated explanations of the drawings. The described advantages of features and/or combinations of features of the disclosure are merely exemplary and may have an alternative or cumulative effect.

In the following, embodiments of the invention are described with reference to the figures. These do not limit the subject matter of this disclosure and the scope of protection.

DESCRIPTION OF THE FIGURES

Figure 1:
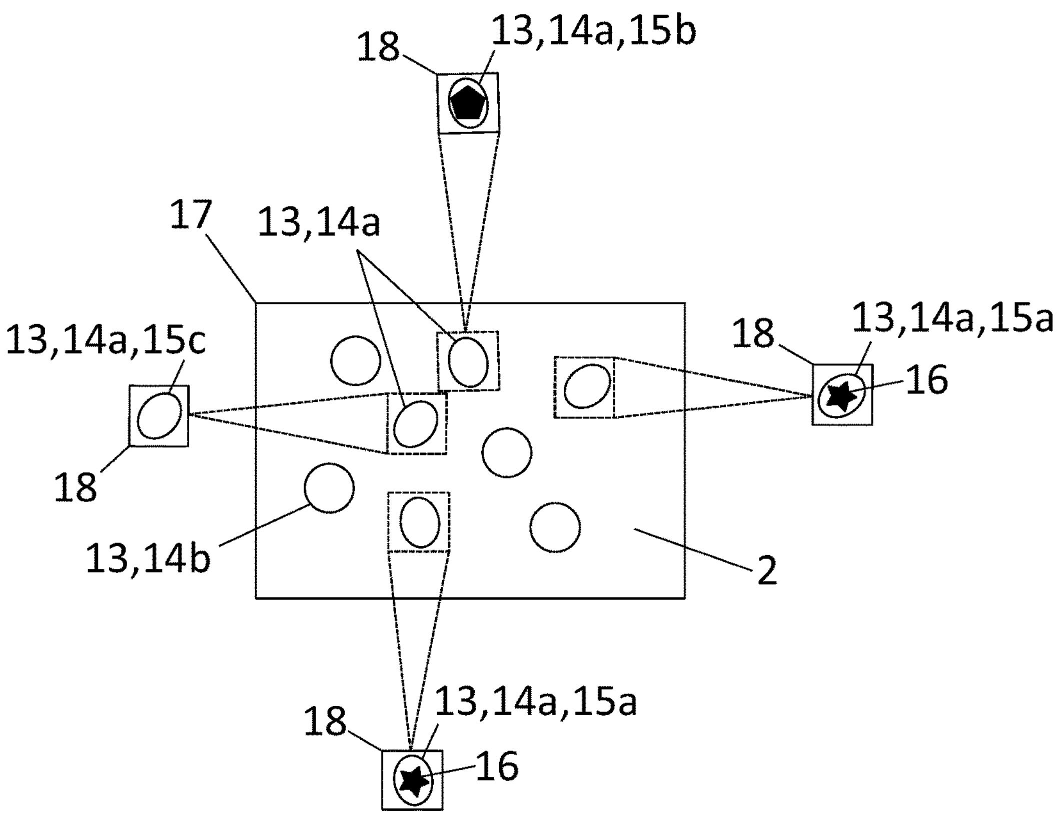
FIG. 1 shows an arrangement of objects in a sample.

FIG. 1 shows an arrangement of objects 13, in particular biological cells, in a sample 2 as it appears in an overview image corresponding to the first light microscopic data 17. The objects 13 are assigned to one of two object classes 14*a*, 14*b* in the context of the method according to the disclosure using the first artificial intelligence method. In the example shown in FIG. 1, the objects 13 of a first object class 14*a* have an oval shape and the objects 13 of a second object class 14*b* have a round shape.

The objective of a screening method here is, for example, to classify the objects 13 of the first object class 14*a* into subcategories 15*a*, 15*b*, 15*c*, of which a first subcategory 15*a* contains a target feature 16. The target feature 16 may be, for example, a specific localization of a fluorescent dye (also referred to as a marker) in the object 13, e.g. an intracellular localization in a biological cell. In the example shown, the objects 13 of the first subcategory 15*a* show a localization of the marker shown as an asterisk, which corresponds to the target feature 16. In contrast, the objects 13 of a second subcategory 15*b* show a different localization of the marker, shown as a pentagon, while the objects 13 of a third subcategory 15*c* do not contain the marker.

In order to automatically assign the objects 13 of the first object class 14*a* to the subcategories 15*a*, 15*b*, 15*c*, second light microscopic data 18 of the corresponding objects 13 are acquired and the classification is performed using the first artificial intelligence method or a second artificial intelligence method based on the second light microscopic data 18.

The first light microscopic data 17 may be acquired using, for example, confocal laser scanning microscopy or wide-field fluorescence microscopy and the second light microscopic data 18 may be acquired using, for example, STED microscopy.

Figure 2:
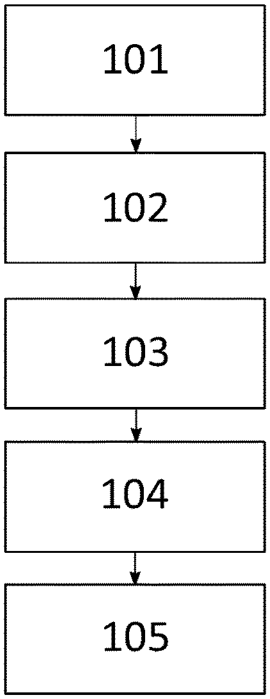
FIG. 2 is a flow chart schematically illustrating steps of a first embodiment.

FIG. 2 schematically illustrates the sequence of the method according to the disclosure according to a first embodiment.

In a first step 101, first light microscopic data of a sample 2 are acquired in a first acquisition mode. The step 102 comprises recognizing an object 13 in the sample 2 from the first light microscopic data 17. The object 13 is assigned to an object class 14*a*, 14*b* in the step 103, which can also be carried out together with the step 102, using a first artificial intelligence method. Subsequently, in step 104, second light microscopic data 18 of the recognized object 13 are acquired in a second acquisition mode. Finally, in the step 105, the object 13 is assigned to a subcategory 15*a*, 15*b*, 15*c* of the object class 14*a*, 14*b* using the first artificial intelligence method or a second artificial intelligence method.

Figure 3:
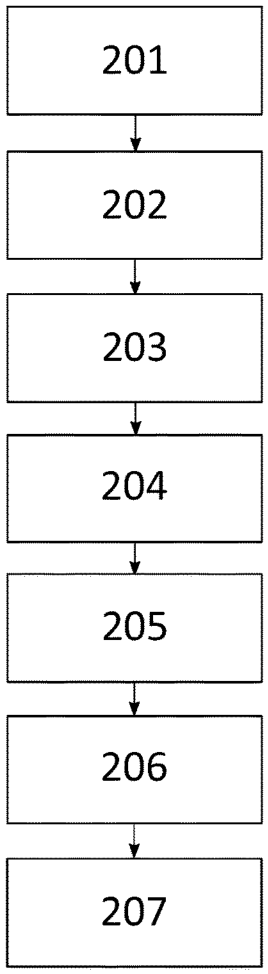
FIG. 3 is a further flow chart schematically illustrating steps of a second embodiment.

FIG. 3 shows a flow chart of a further, second embodiment of the method according to the disclosure.

In the step 201, first light microscopic data 17 of a sample 2 are initially acquired in a first acquisition mode, for example by acquiring an overview image using confocal laser scanning microscopy or wide-field fluorescence microscopy.

Subsequently, an object 13 in the sample 2 is recognized by a first artificial intelligence method, e.g. a first trained artificial neural network, based on the first light microscopic data 17. This may be done, for example, by automatically segmenting the overview image into a binary mask. Subsequently, the object 13 is assigned to an object class 14*a*, 14*b* in step 203 using a first artificial intelligence method, i.e. a classification is performed which may be coupled to the object recognition.

The objects 13 may be biological cells, for example, which contain one or more fluorescent markers (a fluorescent dye coupled to molecules of interest in the cell). In the overview image, for example, one of these fluorescent markers or another dye may be detected.

In step 204, third, three-dimensional, light microscopic data are then initially acquired, for example by creating a stack of images of different focal planes in the sample 2 (so-called z-stack). Such a stack may be used, for example, to determine in which plane of a thicker object 13 fluorescent markers are located.

Based on the third light microscopic data, a partial region of the recognized object 13 is selected in step 205, in particular using the first artificial intelligence method or a further, third artificial intelligence method. Here, for example, a trained artificial neural network may determine in which axial partial region, i.e. in which layer, of the object fluorescence markers, and thus structures of interest, are located.

In the step 206, second light microscopic data 18 are then acquired from the partial region, in particular the axial partial region, of the recognized object 13 in a second acquisition mode. Here, for example, a super-resolution light microscopy technique such as STED microscopy may be used to analyze the localization of the fluorescent marker with a resolution below the diffraction limit. In this case, the second light microscopic data are, for example, a STED image from a focal plane selected based on the z-stack (third optical microscopy data) acquired in step 204.

Finally, the step 207 comprises assigning the object 13 to a subcategory 15*a*, 15*b*, 15*c* of the object class 14*a*, 14*b* based on the second light microscopic data 18 using the first artificial intelligence method or a second artificial intelligence method. Therein, it may optionally be determined whether the object 13 contains a target feature 16.

Figure 4:
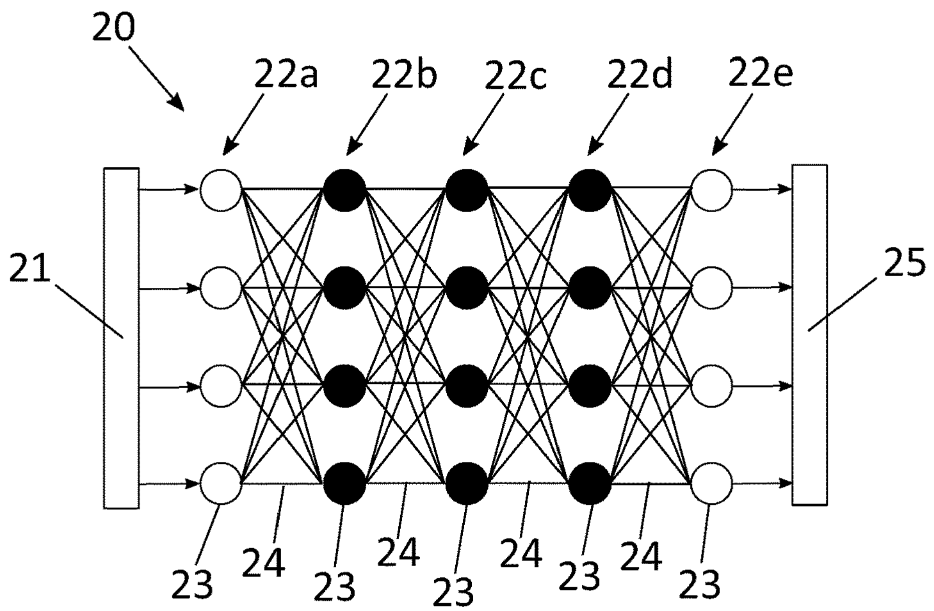
FIG. 4 schematically shows a data processing network.

FIG. 4 schematically illustrates an exemplary data processing network 20, in particular an artificial neural network, with which an artificial intelligence method may be carried out in the context of the method according to the disclosure. The data processing network 20 comprises nodes 23, which are organized in an input layer 22*a*, three hidden layers 22*b*, 22*c*, 22*d* and an output layer 22*e*, and are connected by means of connections 24.

The input layer 22*a* receives input data 21, e.g. light microscopic data. Each node 23 applies a non-linear function to the input data 21, wherein the result of the arithmetic operation is passed on to the nodes 23 of the first hidden layer 22*b* downstream in the data flow direction according to the example shown. The nodes of this layer 22*b* in turn apply a non-linear function to this forwarded data and forward the results to the nodes 23 of the second hidden layer 22*c*. After further arithmetic operations by the third hidden layer 22*d* and the output layer 22*e*, the nodes 23 of the output layer 22*e* output output data 25, e.g. a binary mask representing a segmentation of the light microscopic data.

Even though only three hidden layers 22*b*,22*c*,22*d* are shown in FIG. 4 for a better overview, real data processing networks 20 usually contain significantly more hidden layers 22*b*,22*c*,22*d*, for example hundreds to thousands.

For each of the connections 24 between the nodes 23 of neighboring layers 22*a*, 22*b*, 22*c*, 22*d*, 22*e*, weights are defined in particular which indicate the proportion of the output of a node 23 to the input of the downstream node 23 in the data flow direction.

Such a data processing network 20 may, for example, be trained to segment and classify image data by processing training data from the data processing network 20, for example image data of objects 13 of different categories. This image data may be processed with the data processing network 20, wherein an error function is applied to the result, the value of which reflects the correspondence of the determined result with the correct result, i.e. here, for example, the error function provides a high value if the data processing network 20 assigns an object 13 to a first object class 14*a*, although the object 13 actually belongs to a second object class 14*b*. The weights at the connections 24 between the nodes 23 are then adjusted based on the results of the error function, e.g. with a so-called back propagation, wherein a gradient of the error function is determined for each weight and the weights are adjusted based on the steepest course of the gradient.

Figure 5:
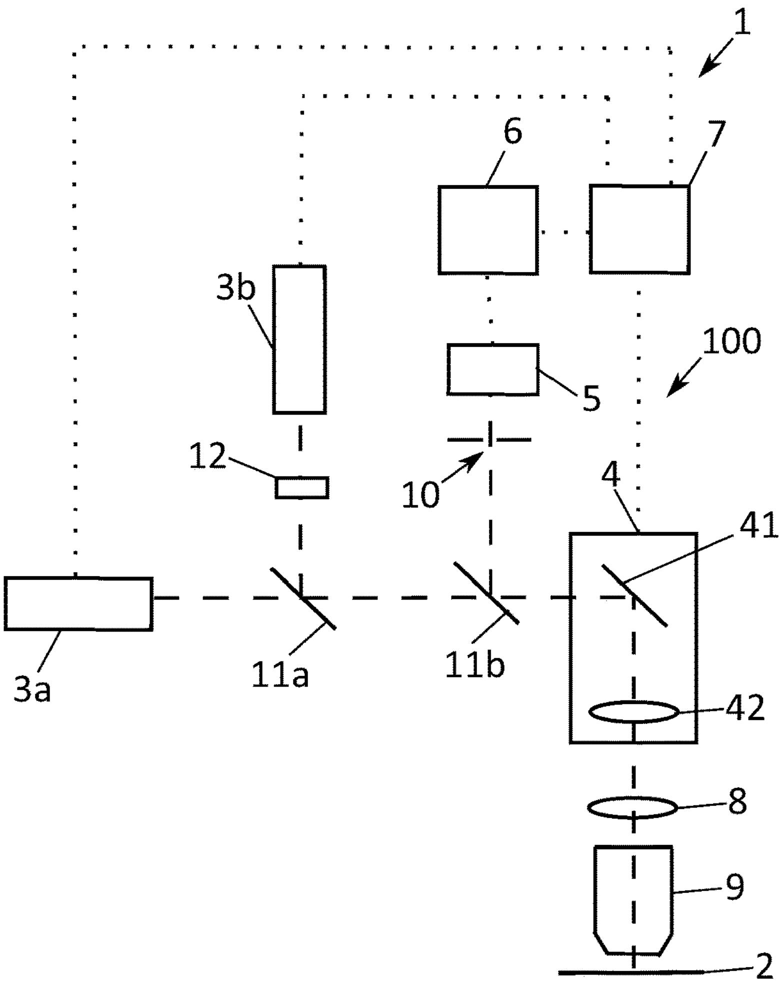
FIG. 5 shows a schematic representation of an embodiment of a device for carrying out the method according to the disclosure, comprising a light microscope and a processor.

FIG. 5 shows an embodiment of a device 1 for carrying out the method according to the disclosure, comprising a light microscope 100 and a processor 6.

The light microscope 100 comprises a first light source 3*a* for generating an excitation light beam and a second light source 3*b* for generating an inhibition light beam, in particular a STED light beam. The inhibition light passes through a light modulator 12, which modulates the phase and/or the amplitude of the inhibition light in order to generate a light distribution of the inhibition light with a local intensity minimum at a common focus of the excitation light and the inhibition light in a sample 2. In this way, the resolution can be improved according to the principle of STED microscopy. The excitation light and the inhibition light are coupled into a common beam path at a first beam splitter 11*a*. The combined excitation light and inhibition light passes through a second beam splitter 11*b*, which deflects light emitted by the sample 2, in particular fluorescent light, via a confocal pinhole 10 to a detector 5, and then through a scanner 4 with a scanning mirror 41 and a scanning lens 42, wherein the scanner 4 laterally displaces the combined light beam and thus scans it over the sample. In FIG. 5, only one scanning mirror 41 is shown for a better overview, although xy-beam scanners in particular comprise at least two mirrors. The combined light beam then passes via a tube lens 8 to an objective 9, which focuses the light beam into the sample 2 in order to excite emitters in an area smaller than the diffraction limit. The fluorescent light emitted by the excited emitters is collected by the objective 9, de-scanned by the scanner 4, reflected by the second beam splitter 11*b* and detected by the confocal detector 5. The signals from the detector 5 are evaluated by a processor 6, wherein an image can be created by the processor 6 based on the light intensities measured for different scan points. The microscope 100 also comprises a control unit 7 connected to the detector 6, the scanner 4, the first light source 3*a* and the second light source 3*b* and optionally other components.

Figure 6:
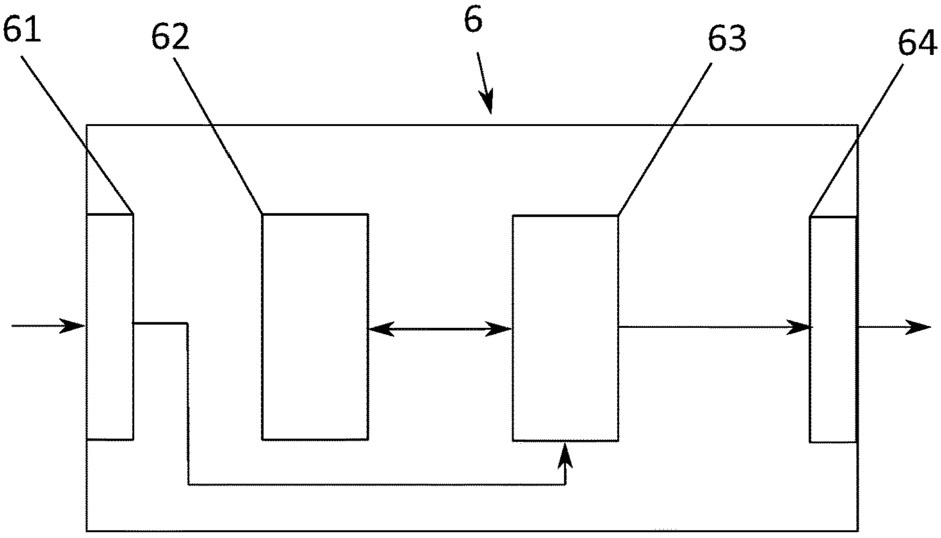
FIG. 6 shows a schematic representation of an embodiment of a processor for carrying out the method according to the disclosure.

The processor 6 is shown schematically in FIG. 6. It comprises a data input 61, a computing unit 62, a memory unit 63 and a data output 64. Information that implements an artificial intelligence method can be stored in the memory unit 63 by the computing unit 62 performing corresponding computing operations. For example, a trained artificial neural network with corresponding weights for the connections 24 between nodes 23 (see FIG. 4) may be stored in the memory unit 63. The processor 6 may receive light microscopic data via the data input 61, which are then converted into output data by the computing unit 62 in accordance with the stored trained artificial neural network; these data may be output via the data output 64 and displayed, for example, by a display unit (not shown), for example as a binary mask representing the objects 13 recognized in the light microscopic data. Alternatively or additionally, the output data may be stored in the memory unit 63 or a separate memory unit.

The components shown in FIG. 6 may be implemented at hardware or software level. Furthermore, the data input 61 and the data output 64 may optionally be combined in a bidirectional data interface.

The processor 6 may be, for example, a computer (in particular a general-purpose computer, a graphic processor unit, an FPGA, field programmable gate array, or an ASICS, application specific integrated circuit), an electronic control unit or an embedded system. The memory unit 63 stores instructions which, when executed by the computing unit 62, cause the device 1 or the light microscope 100 according to the disclosure to carry out the method according to the disclosure. The stored instructions therefore form a program that can be executed by the computing unit 62 in order to carry out the methods described herein, in particular the artificial intelligence methods or artificial intelligence algorithms.

LIST OF REFERENCE SIGNS

1 Device
2 Sample
3*a* First light source
3*b* Second light source
4 Scanner

5 Detector
6 Processor
7 Control unit
8 Tube lens
9 Objective
10 Pinhole
11*a* First beam splitter
11*b* Second beam splitter
12 Light modulator
13 Object
14*a*,14*b* Object class
15*a*,15*b*,15*c* Subcategory
16 Target feature
17 First light microscopic data
18 Second light microscopic data
20 Data processing network
21 Input data
22*a* Input layer
22*b*,22*c*,22*d* Hidden layer
22*e* Output layer
23 Node
24 Connection
25 Output data
41 Scan mirror
42 Scan lens
61 Data input
62 Computing unit
63 Memory unit
64 Data output
100 Light microscope

The invention claimed is:

1. A light microscopy method comprising:

acquiring first light microscopic data of a sample in a first acquisition mode;

recognizing an object in the sample from the first light microscopic data and assigning the object to an object class using a first artificial intelligence method;

acquiring second light microscopic data of the sample in a second acquisition mode; and assigning the object to a subcategory of the object class based on the second light microscopic data using the first artificial intelligence method or a second artificial intelligence method, wherein third three-dimensional light microscopic data of the sample are acquired between the acquisition of the first light microscopic data and the second light microscopic data, wherein a partial region of the recognized object is selected based on the third light microscopic data, and wherein the second light microscopic data are acquired from the selected partial region of the object.

2. The method according to claim 1, wherein the first light microscopic data are acquired in the first acquisition mode in a first color channel, and wherein the second light microscopic data are acquired in the second acquisition mode in a second color channel which is different from the first color channel.

3. The method according to claim 1, wherein the first light microscopic data are acquired in the first acquisition mode at a first resolution, and wherein the second light microscopic data are acquired in the second acquisition mode at a second resolution which is higher than the first resolution.

4. The method according to claim 3, wherein a super-resolution light microscopy method is carried out in the second acquisition mode.

5. The method according to claim 4, wherein the super-resolution light microscopy method is a STED microscopy method, a RESOLFT microscopy method, a MINFLUX method, a STED-MINFLUX method, a PALM/STORM method, a SIM method or a SIMFLUX method.

6. The method according to claim 5, wherein a confocal scanning microscopy method or a wide-field luminescence microscopy method is carried out in the first acquisition mode.

7. The method according to claim 1, wherein the first light microscopic data and the second light microscopic data are acquired with the same magnification.

8. The method according to claim 1, wherein the second light microscopic data are three-dimensional light microscopic data.

9. The method according to claim 8, wherein the second light microscopic data are generated by acquiring an axial stack of images.

10. The method according to claim 1, wherein the first artificial intelligence method is a deep learning method, wherein the first artificial intelligence method is carried out by means of a first trained data processing network, and wherein the second artificial intelligence method is a deep learning method, wherein the second artificial intelligence method is carried out by means of a second trained data processing network.

11. The method according to claim 1, wherein the first artificial intelligence method and/or the second artificial intelligence method is trained by means of a user input in parallel with the execution of the method.

12. The method according to claim 1, wherein the object is a biological entity.

13. The method according to claim 12, wherein the object class describes a cell type, an organelle type, a first phenotype or a cell division stage.

14. The method according to claim 1, wherein the subcategory describes a second phenotype.

15. The method according to claim 1, wherein the object class describes a rare and/or transient state of the object.

16. The method according to claim 1, wherein the third light microscopic data is generated by acquiring an axial stack of images.

17. A device comprising:

a light microscope which is configured to acquire first light microscopic data of a sample in a first acquisition mode and to acquire second light microscopic data of the sample in a second acquisition mode; and a processor which is configured to recognize an object in the sample from the first light microscopic data using a first artificial intelligence method and to assign the object to an object class, wherein the processor is further configured to assign the object to a subcategory of the object class based on the second light microscopic data using the first artificial intelligence method or a second artificial intelligence method, wherein the device is configured such that third three-dimensional light microscopic data of the sample are acquired between acquisition of the first light microscopic data and the second light microscopic data, wherein a partial region of the recognized object is selected based on the third light microscopic data, and wherein the second light microscopic data are acquired from the selected partial region of the object.

18. A non-transitory computer-readable medium for storing computer instructions for carrying out a light microscopy method that, when executed by one or more processors associated with a device comprising a light microscope is configured to perform the method according to claim 1.

* * * * *